(12) United States Patent
Dispenza

(10) Patent No.: US 6,268,408 B1
(45) Date of Patent: Jul. 31, 2001

(54) CONDUCTIVE FIRE-RETARDANT THERMOPLASTIC ELASTOMER MIXTURE

(75) Inventor: John Anthony Dispenza, Long Valley, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/425,397

(22) Filed: Oct. 22, 1999

(51) Int. Cl.⁷ .................................................. C08K 7/02
(52) U.S. Cl. ................................................... 523/222
(58) Field of Search ............................................. 523/222

(56) References Cited

U.S. PATENT DOCUMENTS

| | | | |
|---|---|---|---|
| 4,566,990 | * 1/1986 | Liu | 252/503 |
| 4,596,670 | * 6/1986 | Liu | 252/511 |
| 4,728,461 | * 3/1988 | Fujii | 252/511 |
| 5,294,654 | * 3/1994 | Hellstern-Burnell | 524/127 |
| 5,569,877 | * 10/1996 | Yumi | 174/35 |
| 5,656,371 | * 8/1997 | Kawahigashi | 428/375 |

\* cited by examiner

*Primary Examiner*—Paul R. Michl
(74) *Attorney, Agent, or Firm*—Lucian C. Canepa

(57) ABSTRACT

A conductive soft-durometer fire-retardant mixture comprises a thermoplastic base elastomer material, a fire-retardant material and metal-coated graphite fibers. The resulting mixture is easily molded, relatively low-cost and recyclable.

3 Claims, 2 Drawing Sheets

CONDUCTIVE FIRE-RETARDANT THERMOPLASTIC ELASTOMER MIXTURE

TECHNICAL FIELD

This invention relates to plastic materials and, more particularly, to a conductive, fire-retardant, thermoplastic elastomer mixture.

BACKGROUND OF THE INVENTION

In a variety of applications of practical importance, conductive plastic parts are utilized in electronic assemblies. Thus, for example, conductive plastic parts are often employed for grounding, static discharge and electromagnetic interference (EMI) shielding purposes. Typical parts made of conductive plastic in electronic assemblies include grounding grommets, conductive gaskets, flexible grounding straps, protective boots and face-plate panels for circuit packages. A specific illustrative example of such a face-plate panel is described in a copending commonly assigned U.S. patent application (Ser. No. 08/988,517, filed Dec. 10, 1997).

In the cited application, a two-part unitary panel comprises an electrically non-conductive rigid plastic part combined with an electrically conductive plastic part that serves as a flexible gasket. The panel is utilized to seal an opening in an electronic assembly to reduce the passage of EMI through the enclosure opening.

For the above-specified and other applications, workers skilled in the art have continued to try to develop improved conductive soft-durometer plastic materials. In particular, these attempts have been focused on developing improved conductive plastic materials that can be molded into complex geometries, that are relatively economical and that are recyclable. It was recognized that these efforts, if successful, could reduce the cost and improve the performance of electronic assemblies that include plastic parts made of such materials.

SUMMARY OF THE INVENTION

In accordance with the principles of the present invention, a conductive soft-durometer fire-retardant thermoplastic mixture comprises a base thermoplastic elastomer material combined with a fire-retardant material and a matrix of small-diameter conductive fibers. In one specific illustrative example, the mixture includes a styrene-ethylene-butylene-styrene (SEBS) plastic material combined with antimony trioxide and metal-coated graphite fibers. In one particular formulation, antimony trioxide comprises about 10-to-20 percent by volume of the mixture and the metal-coated graphite fibers comprise approximately 5-to-25 percent by volume of the mixture, with the base elastomer material comprising the remaining volume of the mixture.

BRIEF DESCRIPTION OF THE DRAWING

A complete understanding of the present invention and of the above and other features and advantages thereof may be gained from a consideration of the following detailed description presented hereinbelow in connection with the accompanying drawing, not drawn to scale, in which.

DETAILED DESCRIPTION

Figure 1:
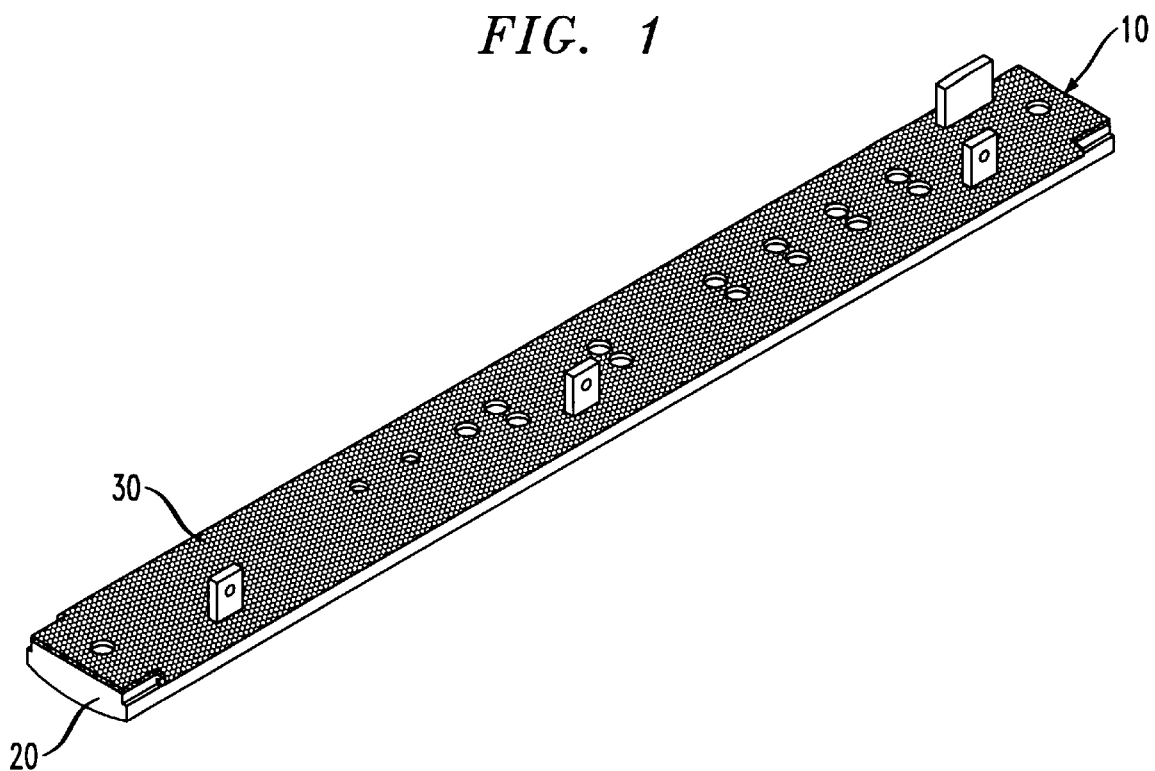
FIG. 1 is a rear perspective view of a shielded panel that includes a specific illustrative gasket made in accordance with the principles of the present invention.

FIG. 1 illustrates one particular example of a portion of an electronic assembly that includes a plastic part made in accordance with the principles of the present invention. Specifically, FIG. 1 shows a two-part panel 10 that comprises a front electrically non-conductive part 20 bonded to a back conductive shield or gasket part 30. In overall structure, the two-part panel 10 is similar to the panel 10 described in the aforecited application. But the part 30 shown in FIG. 1 is formed of a material that embodies the principles of the present invention. This unique material comprises a conductive soft-durometer synthetic rubber that is fire-retardant.

Hereinafter, emphasis will be directed to formulating a mixture and then molding only a single illustrative part such as the part 30 represented in FIG. 1. But it should be understood that it is often advantageous to fabricate a multi-element component such as the two-part panel shown in FIG. 1 in a single injection-molding operation, as described in detail in the aforecited application.

In accordance with the principles of the present invention, plural individual commercially available component materials are combined to form a unique mixture. One component of this mixture comprises a standard base thermoplastic elastomer commonly known as styrene-ethylene-butylene-styrene (SEBS) material. More specifically, this material advantageously comprises, for example, a conventional SEBS material such as Shell Kraton material, which is readily available from a chemical supplier such as Shell Chemical Co., 1 Shell Plaza, Houston, Tex. 77002. Illustratively, the elastomer is supplied in pellet form, each pellet measuring about 0.32 centimeters (cm) in length and having a diameter of approximately 0.32 cm.

The second component of the inventive mixture comprises conductive elements. Advantageously, each of these elements comprises a metal-coated graphite fiber. Other conductive elements such as metal flakes or metal-coated mica are also feasible.

Figure 2:
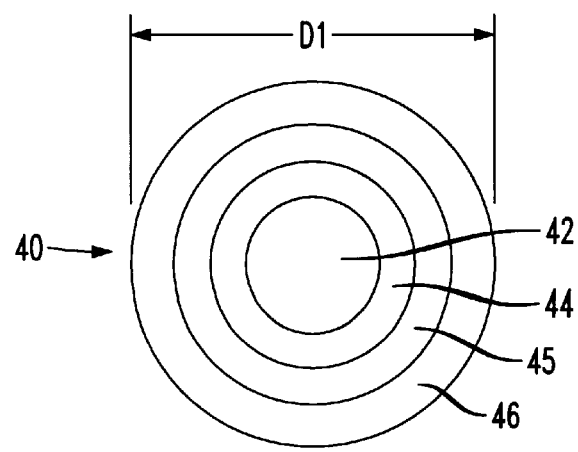
FIG. 2 is a front face view of one of the metal-coated fibers included in the inventive formulation.

By way of a specific example, a front face view of a conventional metal-coated graphite fiber 40 is shown in FIG. 2. In one particular illustrative case, the overall diameter D1 of the FIG. 2 fiber is only about six micrometers ($\mu$m).

The illustrative coated fiber 40 of FIG. 2 includes, for example, a four-$\mu$m-diameter graphite core 42. To enhance the electrical conductivity of the core 42, it is advantageous to coat the core with one or more layers of a relatively high-conductivity material. Thus, for example, the particular fiber 40 of FIG. 2 is shown as having layers 44 through 46 formed thereon. Illustratively, the layers 44 through 46 respectively comprise: a 0.15-$\mu$m-thick layer of nickel, a 0.1-$\mu$m-thick layer of copper and a 0.15-$\mu$m-thick layer of nickel.

As noted above, the diameter of an individual coated fiber such as the fiber 40 depicted in FIG. 2 is extremely small. In practice, it has been found that handling such fine fibers and achieving even distribution of them in the final mixture is extremely difficult. Thus, in accordance with the invention, it is advantageous to utilize fiber bundles rather than individual fibers as one of the starting components of the mixture.

Figure 3:
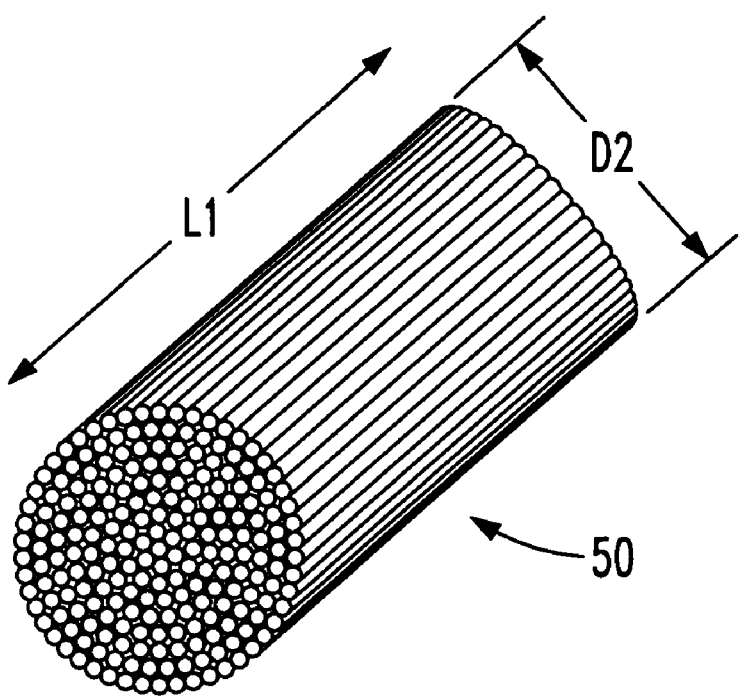
FIG. 3 is a front perspective view showing a multiplicity of the FIG. 2 fibers bundled together.

FIG. 3 represents such a bundle 50 of fibers. Each individual fiber in the bundle is of the type shown in FIG. 2. Such bundles are commonly known and are available from, for example, a commercial supplier such as Composite Materials Inc., 700 Waverly Avenue, Mamaroneck, N.Y. 10543.

Illustratively, the bundle 50 of FIG. 3 comprises approximately 12,000 individual FIG. 2-type fibers bonded together. By way of example, the individual fibers are adhered to each other with a conventional sizing or bonding agent. For the particular case in which the base elastomer of the inventive mixture comprises SEBS, it is advantageous to specify a standard styrene-based sizing, thereby to ensure good compatibility, and intimate mixing in the final mixture, between the fiber bundles and the thermoplastic base material.

In accordance with the invention, the length-to-diameter or aspect ratio of each individual fiber bundle (such as the bundle 50 of FIG. 3) is selected to achieve maximum electrical conductivity when the individual fibers are subsequently dispersed throughout the final mixture. Thus, for example, in one specific illustrative case, the diameter D2 and the length L1 of the bundle represented in FIG. 3 are designed to be about 0.23-to-0.25 cm and 0.51-to-0.64 cm, respectively.

Accordingly, commercially available fiber bundles of the type represented in FIG. 3 are advantageously cut up to provide bundle segments having the advantageous aspect ratio specified above. As a result, when the bundles are disassembled and the individual coated fibers are dispersed throughout the final mixture, there will inevitably be multiple contact points among the fibers. This ensures that the mixture will exhibit a relatively high electrical conductivity.

The third component required to form the inventive mixture comprises a fire-retardant material. One specific illustrative such material suitable for inclusion in the mixture comprises a commonly known material such as antimony trioxide, which is readily available in, for example, powder form from a commercial supplier such as Laurel Industries Inc., 30,000 Chagrin Boulevard, Cleveland, Ohio 44124. Other fire-retardants such as alumina trihydrates and brominated organics are feasible substitutes.

In accordance with the invention, the three above-specified individual component materials are mixed together. Advantageously, in this mixture the fiber-bundle segments comprise about 5-to-25 percent by volume of the total mixture, the fire-retardant material comprises approximately 10-to-20 percent by volume and the remaining volume comprises the base elastomer thermoplastic material.

Illustratively, mixing of the three components is carried out in a conventional single- or twin-screw extruder. Advantageously, the fiber-bundle segments are not introduced into the extruder stream at the beginning thereof but rather at a later intermediate point. In practice, for each particular extruder, it is an easy matter to determine a suitable intermediate point at which introduced fiber-bundle segments are partially dispersed while suffering little if any fiber breakage due to heat and/or mechanical motion during the remaining extrusion process.

In the particular illustrative aforespecified mixing process, the extruder provides at its output pellets that each include the three noted components. By way of example, each such pellet provided by the extruder has a diameter of about 0.32 cm and a length of approximately 0.64-to-0.76 cm. The base elastomer and the fire-retardant materials are well-distributed throughout each such pellet. But typically, if mixing occurs in a standard extruder in the manner described above, the fiber-bundle segments are only partially disassembled and dispersed throughout each pellet. Typically, in each pellet numerous clumps or fiber-bundle segments remain to be dispersed.

By way of a specific illustrative example, the aforespecified pellets provided by the extruder are then introduced into a conventional injection-molding machine. In the molding machine, the pellets are liquified and further dispersion of the metal-coated fibers occurs. Eventually, before actual molding takes place, the fibers are evenly distributed throughout the liquid mixture, thereby providing a mixture to be molded in which a contacting matrix of intertwined individual fibers is provided. In that way, a highly conductive mixture is realized.

Subsequently, molding of a plastic part is carried out in the injection-molding machine. In practice, it has been found that the inventive mixture described herein is capable of being molded in a standard machine in a high-speed fabrication process to form parts having complex geometries. Significantly, the flexible soft-durometer parts so produced are economical, conductive, fire-retardant and recyclable.

Finally, it is to be understood that the various above-described formulations and techniques are only illustrative of the application of the principles of the present invention. In accordance with these principles, numerous other modifications and alternatives may be devised by those skilled in the art without departing from the spirit and scope of the present invention. Thus, for example, although primary emphasis above was illustratively directed to a particular procedure in which the conductive elements of the inventive mixture were initially only partially dispersed throughout the mixture during the mixing step in an extruder, and dispersion was completed later during the injection-molding process, it is apparent that other standard mixing procedures may be employed for achieving substantially complete dispersion of the conductive elements throughout the mixture before initiation of the actual molding operation.

What is claimed is:

1. A conductive fire-retardant thermoplastic mixture, said mixture including
   a thermoplastic base elastomer material,
   conductive material comprising a matrix of conductive elements, each of said conductive elements comprising a flexible fiber characterized by a length-to-diameter ratio of approximately one thousand,
   and fire-retardant material,
       wherein said conductive elements comprise metal-coated graphite fibers,
       wherein said base material comprises a thermoplastic synthetic rubber material,
       wherein, before mixing of said aforespecified materials takes place, said metal-coated fibers are bundled together to form fiber segments each including a multiplicity of individual coated fibers adhered together,
       wherein said length-to-diameter ratio of each of said individual coated fibers is such that, when the fibers in each segment are dispersed in the final mixture, a contacting matrix of individual conductive fibers is established therein,
       and wherein said fiber segments comprise about 5-to-25 percent by volume of the material of said mixture, wherein said fire-retardant comprises approximately 10-to-20 percent by volume of the material of said mixture, and said thermoplastic base material comprises the remaining volume of said mixture.

2. A mixture as in claim 1 wherein each of said flexible conductive fibers has a diameter of about six micrometers.

3. A method of making a conductive fire-retardant thermoplastic mixture, said method including the steps of combining a thermoplastic base elastomer material, a fire-retardant material and conductive material that comprises metal-coated fibers bundled together to form fiber segments each including a multiplicity of individual coated fibers adhered together, wherein each individual coated fiber has a diameter of about six micrometers and a length-to-diameter ratio of approximately one thousand, wherein said fire-retardant material comprises about 10-to-20 percent by volume of said mixture wherein said fiber segments comprise about 5-to-25 percent by volume of said mixture, and said thermoplastic base material comprises the remaining volume of said mixture, and mixing said materials to disperse said fiber segments and to break the adhesion between individual fibers to form a distributed contacting matrix of individual coated fibers throughout the mixture.

* * * * *